United States Patent
Xu

(10) Patent No.: US 9,130,468 B2
(45) Date of Patent: *Sep. 8, 2015

(54) CONSTANT VOLTAGE CONSTANT CURRENT CONTROLLER AND CONTROL METHOD THEREOF

(71) Applicant: Silergy Semiconductor Technology (Hangzhou) LTD, Hangzhou, ZheJiang Province (CN)

(72) Inventor: Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/533,311

(22) Filed: Nov. 5, 2014

(65) Prior Publication Data
US 2015/0055383 A1 Feb. 26, 2015

Related U.S. Application Data

(63) Continuation of application No. 13/750,622, filed on Jan. 25, 2013, now Pat. No. 8,917,528.

(30) Foreign Application Priority Data

Feb. 28, 2012 (CN) .......................... 2012 1 0047752

(51) Int. Cl.
*H02M 3/335* (2006.01)
(52) U.S. Cl.
CPC .......... *H02M 3/33507* (2013.01); *H02M 3/335* (2013.01)

(58) Field of Classification Search
CPC .................. H02M 1/4258; H02M 2001/0032; H02M 2001/0009
See application file for complete search history.

(56) References Cited

U.S. PATENT DOCUMENTS

| | | | |
|---|---|---|---|
| 8,279,631 B2 * | 10/2012 | Yang | 363/20 |
| 2006/0050539 A1 * | 3/2006 | Yang et al. | 363/21.16 |
| 2007/0103134 A1 * | 5/2007 | Yang et al. | 323/282 |
| 2007/0133234 A1 * | 6/2007 | Huynh et al. | 363/20 |
| 2008/0094047 A1 * | 4/2008 | Huynh et al. | 323/282 |
| 2009/0206814 A1 * | 8/2009 | Zhang et al. | 323/284 |
| 2010/0061126 A1 * | 3/2010 | Huynh et al. | 363/21.12 |
| 2010/0165666 A1 * | 7/2010 | Wang et al. | 363/21.01 |

(Continued)

FOREIGN PATENT DOCUMENTS

JP 2010093874 A 4/2010

*Primary Examiner* — Timothy J Dole
*Assistant Examiner* — Yusef Ahmed
(74) *Attorney, Agent, or Firm* — Michael C. Stephens, Jr.

(57) ABSTRACT

The present invention relates to a constant voltage constant current (CVCC) controller, and associated control methods. In one embodiment, a CVCC controller for a flyback converter can include: (i) a current controller configured to generate an error signal by comparing an output current feedback signal against a reference current; (ii) a voltage controller configured to receive an output voltage feedback signal and a reference voltage, and to generate a control signal; (iii) a selector configured to control the flyback converter to operate in a first or a second operation mode based on the control signal, and to further generate a constant voltage or a constant current control signal based on the error signal; and (iv) a pulse-width modulation (PWM) controller configured to generate a PWM control signal to control a main switch, and to maintain the output voltage and/or current of the flyback converter as substantially constant.

18 Claims, 11 Drawing Sheets

(56) References Cited

U.S. PATENT DOCUMENTS

| | | | |
|---|---|---|---|
| 2010/0208500 A1* | 8/2010 | Yan et al. | 363/21.12 |
| 2011/0157924 A1* | 6/2011 | Huynh | 363/21.15 |
| 2011/0157936 A1* | 6/2011 | Huynh | 363/78 |
| 2011/0261596 A1* | 10/2011 | Zong et al. | 363/21.13 |
| 2011/0286248 A1* | 11/2011 | Wang et al. | 363/21.18 |
| 2012/0075891 A1* | 3/2012 | Zhang et al. | 363/21.18 |
| 2012/0201063 A1* | 8/2012 | Sugawara | 363/89 |
| 2012/0224397 A1* | 9/2012 | Yeh | 363/21.12 |
| 2012/0262961 A1* | 10/2012 | Chien et al. | 363/84 |
| 2013/0051083 A1* | 2/2013 | Zhao | 363/17 |
| 2013/0250629 A1* | 9/2013 | Xu | 363/21.17 |
| 2013/0294118 A1* | 11/2013 | So et al. | 363/21.16 |
| 2013/0308350 A1* | 11/2013 | Huang et al. | 363/21.16 |
| 2014/0016366 A1* | 1/2014 | Su et al. | 363/21.12 |
| 2014/0036548 A1* | 2/2014 | Yang et al. | 363/21.07 |
| 2014/0071714 A1* | 3/2014 | Li | 363/16 |
| 2014/0211516 A1* | 7/2014 | Kung et al. | 363/21.13 |
| 2014/0211519 A1* | 7/2014 | Hsu et al. | 363/21.17 |

\* cited by examiner

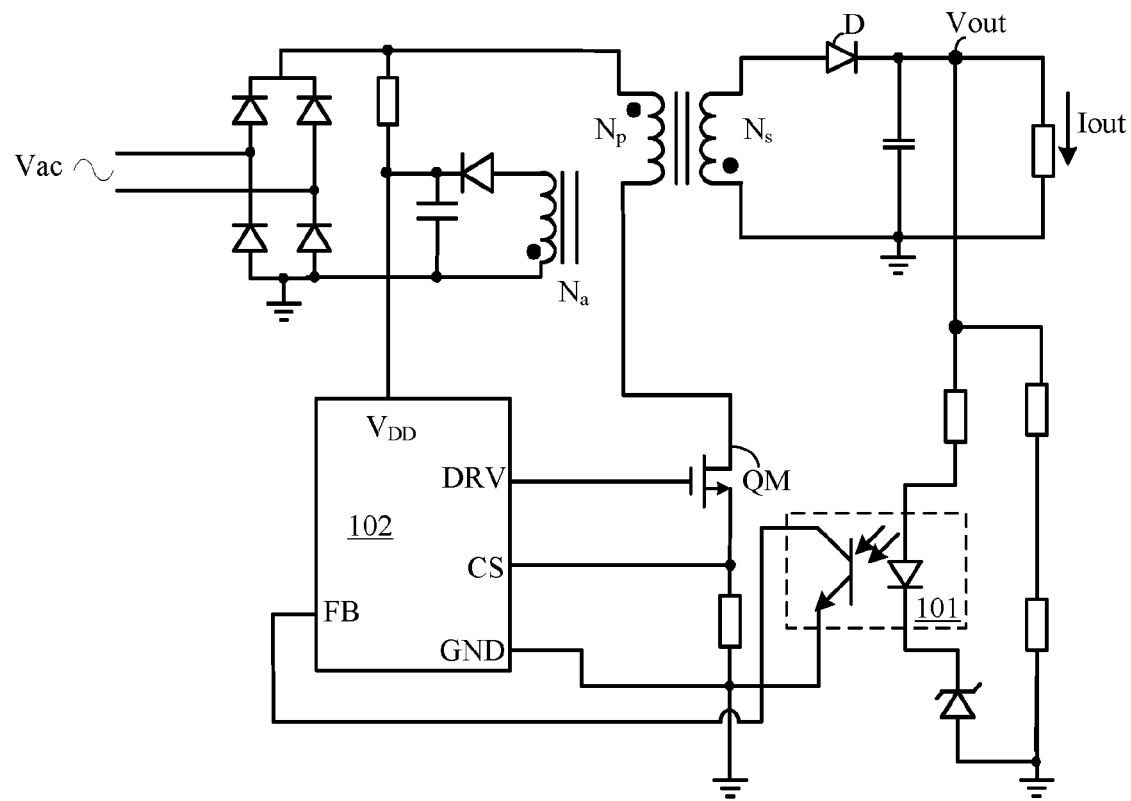
FIG. 1 (conventional)

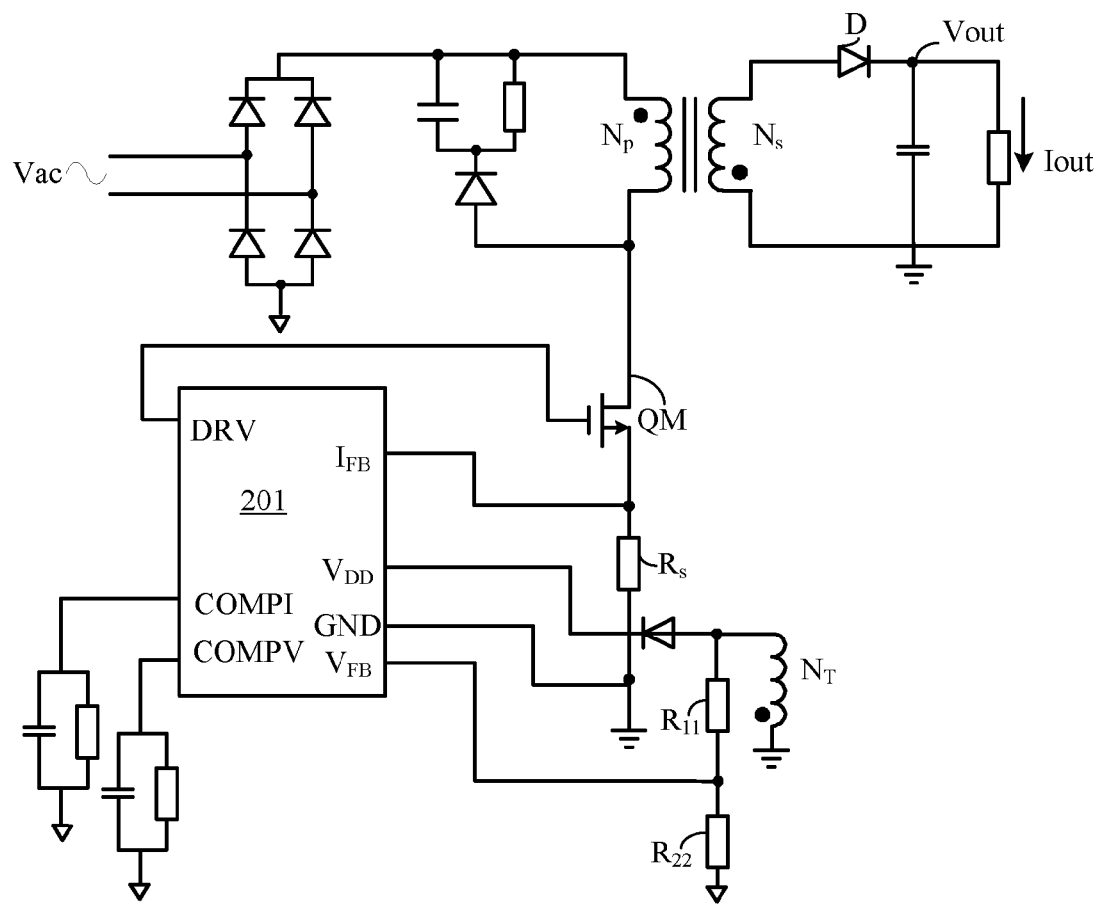
FIG. 2 (conventional)

CONSTANT VOLTAGE CONSTANT CURRENT CONTROLLER AND CONTROL METHOD THEREOF

RELATED APPLICATIONS

This application is a continuation of the following application, U.S. patent application Ser. No. 13/750,622, filed on Jan. 25, 2013, now issued as U.S. Pat. No. 8,917,528, and which is hereby incorporated by reference as if it is set forth in full in this specification, and which also claims the benefit of Chinese Patent Application No. 201210047752.4, filed on Feb. 28, 2012, which is incorporated herein by reference in its entirety.

FIELD OF THE INVENTION

The present invention relates to the field of switch mode power supply (SMPS), and more specifically to a constant voltage constant current (CVCC) controller, and associated control methods.

BACKGROUND

With rapid development in the power supply industry, applications of constant voltage (CV) and/or constant current (CC) switch mode power supplies have increased. Consequently, requirements for CV and/or CC controllers have increased, and power supply manufactures are targeting power supplies with high performance, small volume, and low product costs. As shown in FIG. 1, an example of a conventional secondary controlled CVCC controller for a flyback converter can regulate an output voltage and an output current through sampling resistors, optical coupler 101, and secondary-side feedback controller 102. Sampling resistors can be used to sense output voltage or current, and generate a feedback signal. Optical coupler 101 can be used to transfer the feedback signal to secondary-side feedback controller 102, and second-side feedback controller 102 can be used to control switch QM. In this way, the output voltage and output current can be regulated as substantially constant. However, drawbacks of this approach include high power losses and high product costs, due to feedback components for the secondary-side feedback controller and an optical coupler to transfer the feedback signal.

FIG. 2 shows an example primary controlled CVCC controller for a flyback converter. This flyback converter can include primary winding $N_p$, secondary winding $N_s$, auxiliary winding $N_T$, main switch QM, current sense resistor $R_s$, dividing resistors $R_{11}$ and $R_{22}$, and controller 201. Auxiliary winding $N_T$ can be used to obtain output voltage information, dividing resistors $R_{11}$ and $R_{22}$ can be used to divide the output voltage information and generate secondary output voltage feedback signal $V_{FB}$, and current sense resistor $R_s$ can be used to detect primary current $I_s$ and generate secondary output current feedback signal $I_{FB}$. Controller 201 can be used to receive output voltage feedback signal $V_{FB}$ and output current feedback signal $I_{FB}$ to control a duty cycle of switching signal of main switch QM. As a result, CVCC on the secondary-side can be achieved.

Though the volume and product costs of the example CVCC controller of FIG. 2 can be reduced, other drawbacks remain. For example, during operation of the flyback converter, when the current flowing through secondary winding $N_s$ is reduced to about zero, an induced voltage on secondary winding $N_T$ may be significantly decreased, and as a result secondary output voltage feedback signal $V_{FB}$ may not follow variation of the output voltage precisely to yield a large deviation. In this approach, the system may not be precisely controlled. In addition, implementation of the controller may be relatively complicated with a large number of circuit components, because a constant voltage control loop and a constant current control loop controlled by an external compensating circuit may be included.

SUMMARY

In one embodiment, a constant voltage constant current (CVCC) controller for a flyback converter can include: (i) a current controller configured to generate an error signal by calculating the difference between an output current feedback signal and a reference current; (ii) a voltage controller configured to receive an output voltage feedback signal and a reference voltage, and to generate a control signal; (iii) a selector coupled to the current controller and the voltage controller, and configured to receive the error signal and the control signal, and to control the flyback converter to operate in a first operation mode or a second operation mode based on the control signal, where when the flyback converter is operating in the first operation mode, the selector is configured to generate a constant voltage control signal based on the error signal, and where when the flyback converter is operating in the second operation mode, the selector is configured to generate a constant current control signal based on the error signal; and (iv) a pulse-width modulation (PWM) controller configured to generate a PWM control signal to control a main switch, where when the flyback converter is operating in the first operation mode, the PWM controller is configured to generate a constant voltage signal based on the constant voltage control signal to maintain an output voltage of the flyback converter as substantially constant, and where when the flyback converter is operating in the second operation mode, the PWM controller is configured to generate a constant current signal based on the constant current control signal to maintain an output current of the flyback converter as substantially constant.

In one embodiment, a CVCC control method for a flyback converter, can include: (i) calculating a difference between an output current feedback signal and a reference current to generate an error signal; (ii) comparing an output voltage feedback signal and a reference voltage to generate a control signal; (iii) controlling the flyback converter to operate in a first operation mode or a second operation mode based on the control signal; (iv) generating a constant voltage control signal based on the error signal, and generating a PWM control signal based on the constant voltage control signal to control a switching duty cycle of a main switch, to maintain an output voltage of the flyback converter as substantially constant when the flyback converter is operating in the first operation mode; and (v) generating a constant current control signal based on the error signal, and generating the PWM control signal based on the constant current control signal to control the switching duty cycle of the main switch, to maintain an output current of the flyback converter as substantially constant when the flyback converter is operating in the second operation mode.

Embodiments of the present invention can advantageously provide several advantages over conventional approaches. For example, a CVCC controller can set a flyback converter to operate in a first operation mode or a second operation mode through a selector to realize constant voltage control or constant current control. The CVCC controller can also improve the transient response speed by setting a discharging current in proportion to the output voltage feedback signal. Also, the CVCC controller can generate an output voltage feedback signal and an output current feedback signal more precisely than conventional approaches by using a voltage feedback circuit and a current feedback circuit. Other advantages of the present invention may become readily apparent from the detailed description of preferred embodiments below.

BRIEF DESCRIPTION OF THE DRAWINGS

FIG. 1 is a schematic diagram of an example conventional secondary controlled CVCC controller for a flyback converter.

FIG. 2 is a schematic diagram of an example conventional primary controlled CVCC controller for a flyback converter.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 3:
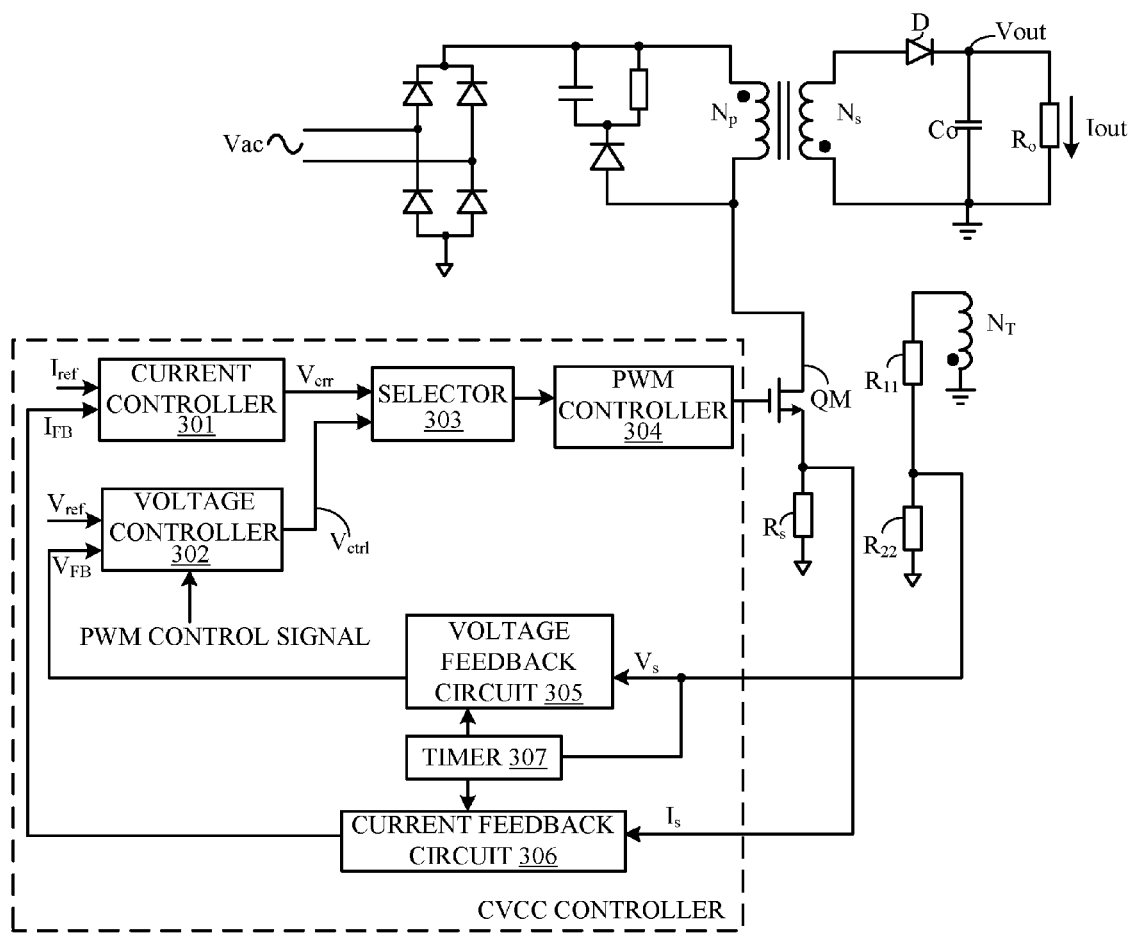
FIG. 3 is a schematic diagram of a first example CVCC controller in accordance with embodiments of the present invention.

Referring now to FIG. 3, shown is a schematic diagram of a first example constant voltage constant current (CVCC) controller in accordance with embodiments of the present invention. For example, such a CVCC controller can be used in a flyback converter. Of course, CVCC controllers as described herein can also be utilized in other types of converters or power regulators. A flyback converter can include a power stage circuit, where the power stage can include primary winding $N_p$, secondary winding $N_s$, auxiliary winding $N_T$, main switch QM, current sense resistor $R_s$, and dividing resistors $R_{11}$ and $R_{12}$. In this example, the CVCC controller can be used to receive output voltage feedback signal $V_{FB}$ and output current feedback signal $I_{FB}$, and to generate a constant voltage/constant current control signal to regulate a switching duty cycle of main switch QM, and to maintain output voltage $V_{out}$ or output current $I_{out}$ as substantially constant.

The CVCC controller of FIG. 3 can include current controller 301, voltage controller 302, selector 303, pulse-width modulation (PWM) controller 304, voltage feedback circuit 305, current feedback circuit 306, and timer 307. Voltage feedback circuit 305 and current feedback circuit 306 can be used to obtain output voltage feedback signal $V_{FB}$ and output current feedback signal $I_{FB}$, respectively. As compared to the primary controlled scheme shown in FIG. 2, this example of FIG. 3 can follow the variation of output voltage $V_{out}$ and output current $I_{out}$ more precisely. Example operation and other aspects of voltage feedback circuit 305 and current feedback circuit 306 will be discussed in more detail below.

As shown in FIG. 3, current controller 301 can be used to compare output current feedback signal $I_{FB}$ against reference current $I_{ref}$ to generate error signal $V_{err}$. Voltage controller 302 can be used to compare output voltage feedback signal $V_{FB}$ against reference voltage $V_{ref}$ to generate control signal $V_{ctrl}$. Selector 303 can be coupled to current controller 301 and voltage controller 302 to receive error signal $V_{err}$ and control signal $V_{ctrl}$, and to control the flyback converter operating in a first operation mode or a second operation mode.

When control signal $V_{ctrl}$ is a pulse signal with a fixed duty cycle, selector 303 can be used to control the flyback converter operating in the first operation mode (e.g., constant voltage mode), and to generate a constant voltage control signal to PWM controller 304 based on error signal $V_{err}$. Also, PWM controller 304 can be used to generate a PWM control signal to control the switching duty cycle of main switch QM. Therefore, output voltage $V_{out}$ of the flyback converter can be maintained as substantially constant.

When control signal $V_{ctrl}$ remains high, selector 303 can be used to control the flyback converter operating in the second operation mode (e.g., constant current mode), and to generate a constant current control signal to PWM controller 304 based on error signal $V_{err}$. Also, PWM controller 304 can be used to generate a PWM control signal to control the switching duty cycle of main switch QM. Therefore, output current $I_{out}$ of the flyback converter can be maintained as substantially constant.

Figure 4:
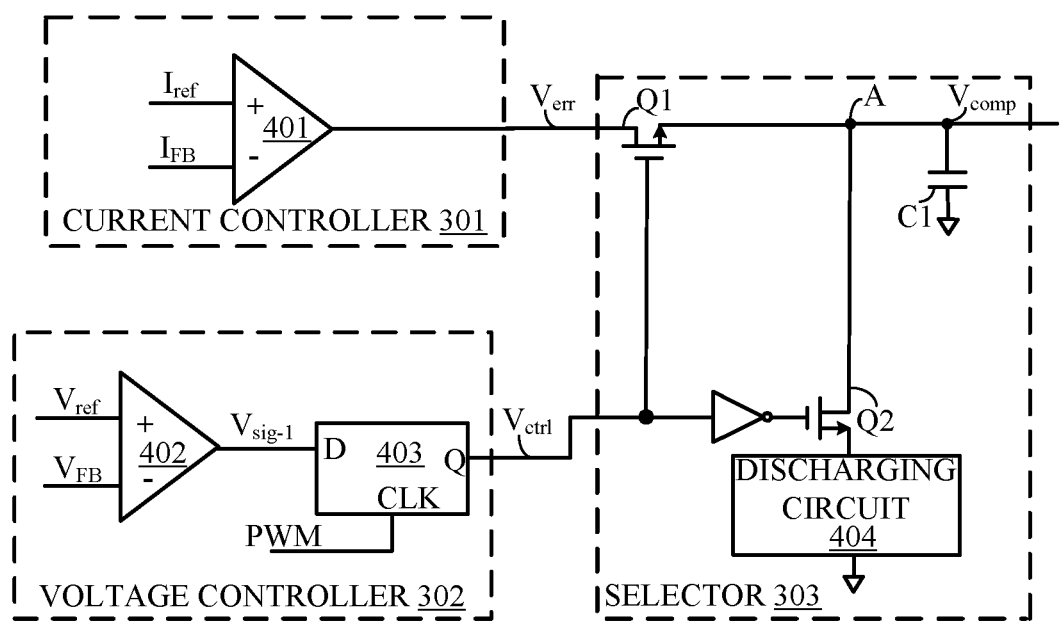
FIG. 4 is a schematic diagram of a second example CVCC controller in accordance with embodiments of the present invention.

Referring now to FIG. 4, shown is a schematic diagram of a second example CVCC controller in accordance with embodiments of the present invention. Current controller 301 can include transconductance amplifier 401, where the non-inverting terminal of transconductance amplifier 401 can be used to receive reference current $I_{ref}$, the inverting terminal can be used to receive output current feedback signal $I_{FB}$, and the output terminal can be used to produce error signal $V_{err}$. Voltage controller 302 can include comparator 402 and logic controller 403, where the non-inverting terminal of comparator 402 can be used to receive reference voltage $V_{ref}$, the inverting terminal can be used to receive output voltage feedback signal $V_{FB}$, and the output terminal can be used to produce middle signal $V_{sig-1}$. Logic controller 403 can include a D flip-flop, where the D terminal can be coupled to comparator 402 to receive middle signal $V_{sig-1}$, and the CLK terminal can be used to receive the PWM control signal. For example, at each rising edge of the PWM control signal, control signal $V_{ctrl}$ can be generated at Q terminal based on middle signal $V_{sig-1}$.

Selector 303 can include switch Q1, switch Q2, discharging circuit 404, and capacitor C1. A first terminal of switch Q1 can be coupled to current controller 301 to receive error signal $V_{err}$, a second terminal can be coupled to the first terminal of switch Q2, and a control terminal can be used to receive control signal $V_{ctrl}$. The control terminal of switch Q2 can be coupled to voltage controller 302 to receive control signal $V_{ctrl}$, and a second terminal of switch Q2 can be coupled to discharging circuit 404. One terminal of capacitor C1 can be coupled to common junction A of switch Q1 and switch Q2, and the other terminal of capacitor C1 can be coupled to the ground. Also, the cross voltage of capacitor C1 can be constant voltage/constant current control signal $V_{comp}$. For example, the discharging time of discharging circuit 404 can be constant or flexible, thus discharging circuit 404 can include a constant resistor or a variable resistor. Also, discharging circuit 404 can include a constant current source or a variable current source.

In one example operation process, when control signal $V_{ctrl}$ is a pulse signal with fixed duty cycle, the load of the flyback converter may be in a "normal" state or a light-load state. Under this condition, if output voltage feedback signal $V_{FB}$ is greater than reference voltage $V_{ref}$, middle signal $V_{sig-1}$ generated by comparator 402 can be low to cause control signal $V_{ctrl}$ to also below. However, if output voltage feedback signal $V_{FB}$ is less than reference voltage $V_{ref}$, middle signal $V_{sig-1}$ generated by comparator 402 can go high, and control signal $V_{ctrl}$ can be generated based on the PWM control signal. In this example, control signal $V_{ctrl}$ may go high at each rising edge of the PWM control signal. Thus, when control signal $V_{ctrl}$ is a pulse signal with fixed duty cycle, selector 303 can be used to control the flyback converter operating in the first operation mode (e.g., constant voltage mode).

In an example constant voltage control process, when output voltage feedback signal $V_{FB}$ is greater than reference voltage $V_{ref}$, control signal $V_{ctrl}$ can be low, switch Q1 can be off, while switch Q2 can be on. Also, capacitor C1 can be discharged through discharging circuit 404, so constant voltage control signal $V_{comp\_v}$ can be reduced to lower the duty cycle of the PWM control signal. As a result, output voltage feedback signal $V_{FB}$ can be reduced. However, when output voltage feedback signal $V_{FB}$ is less than reference voltage $V_{ref}$, control signal $V_{ctrl}$ can go high, switch Q1 can be turned on, and switch Q2 can be turned off. Also, capacitor C1 can be charged based on output current feedback signal $I_{FB}$, and as a result constant voltage control signal $V_{comp\_v}$ can be increased to increase the duty cycle of the PWM control signal. Thus, output voltage feedback signal $V_{FB}$ can correspondingly be increased. By repeating such processes, output voltage $V_{out}$ can be maintained as substantially constant.

When control signal $V_{ctrl}$ is in high level, the load of the flyback converter may be in an "abnormal" state (e.g., heavy-load state). Under this condition, output voltage feedback signal $V_{FB}$ can be maintained as less than reference voltage $V_{ref}$. Thus, middle signal $V_{sig-1}$ can remain high, and control signal $V_{ctrl}$ can also be in a high state. As a result, switch Q1 can remain off while switch Q2 can remain on. Selector 303 can be used to control the flyback converter operating in the second operation mode (e.g., constant current mode). In one example constant current control process, when output current $I_{out}$ is changing, output current feedback signal $I_{FB}$ may also be changed. As error signal $V_{err}$ can be increased or reduced, the charging current for capacitor C1 can also be increased or reduced to change constant current control signal $V_{comp\_I}$. In this way, the duty cycle of the PWM control signal can be regulated to maintain output current $I_{out}$ as substantially constant.

Figure 5:
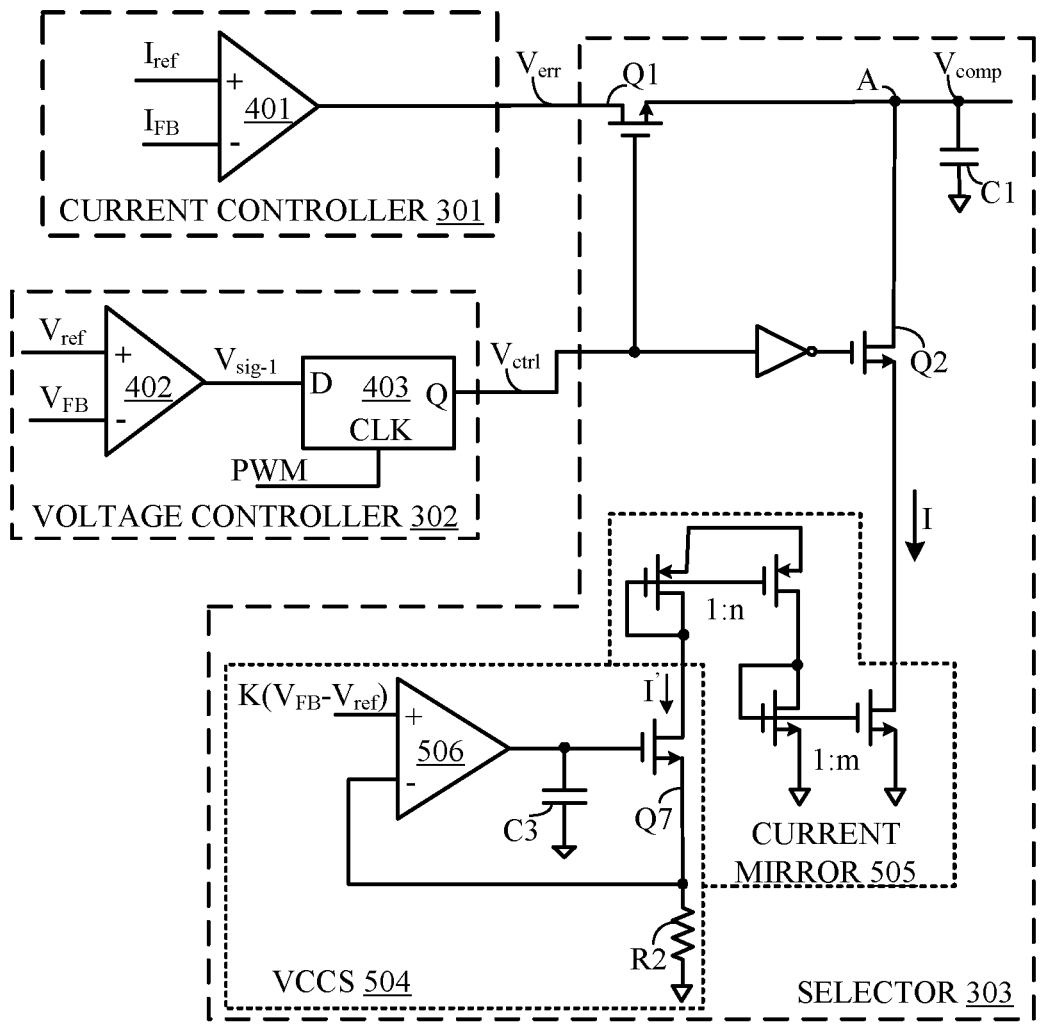
FIG. 5 is a schematic diagram of a third example CVCC controller in accordance with embodiments of the present invention.

Referring now to FIG. 5, shown is a schematic diagram of a third example CVCC controller in accordance with embodiments of the present invention. In this example, output voltage feedback signal $V_{FB}$ can be used to control the discharging current through voltage controlled current source (VCCS) 504. Also, discharging circuit 404 can include current mirror 505.

VCCS 504 can include comparator 506, capacitor C3, resistor R2, and switch Q7. The non-inverting terminal of comparator 506 can be used to receive signal $K(V_{FB}-V_{ref})$, where signal $K(V_{FB}-V_{ref})$ is in proportion to the difference between output voltage feedback signal $V_{FB}$ and reference voltage $V_{ref}$, and K is a proportionality coefficient. The output terminal of comparator 506 can be coupled to the control terminal of switch Q7. The second terminal of switch Q7 can be coupled to resistor R2. Also, a common junction of switch Q7 and resistor R2 can be coupled to the inverting terminal of comparator 506. One terminal of third capacitor C3 can be coupled to a common junction of comparator 506 and switch Q7, and the other terminal can be coupled to the ground.

Current I' generated at a first terminal of switch Q7 can equal to $$\frac{k(V_{FB} - V_{ref})}{R_2},$$

and can first be amplified by n times through a first current mirror in current mirror 505, and then be amplified by m times through a second current mirror in current mirror 505. Thus, current I that is output by current mirror 505 can equal to $\eta(V_{FB}-V_{ref})$, and can be used as the discharge current for capacitor C1, where $$\eta = \frac{k \cdot n \cdot m}{R_2}.$$

From the example in FIG. 5, the discharging circuit can be a variable current source, and discharging current I can be produced in proportion to the difference between output voltage feedback signal $V_{FB}$ and reference voltage $V_{ref}$. In this way, the discharging time of capacitor C1 can be changed, and as a result the transient response speed of the CVCC controller can be improved.

Also, from the examples shown in FIGS. 3, 4 and 5, it can be deduced that the CVCC controller can set the flyback converter operating in different operation modes through selector 303 to achieve constant voltage control or constant current control. During the constant voltage or constant current control process, only one compensating capacitor may be needed, so the circuit structure can be simplified as compared to conventional approaches. Further, current controller 301, voltage controller 302, selector 303, and discharging circuit 404 can be configured by any other suitable circuits with the same or a similar function, and switches of the CVCC controller can be MOSFET transistors, or any other appropriate switch implementations.

During operation of the flyback converter, when main switch QM is turned off, secondary winding $N_s$ may start to discharge. At the same time, the cross voltage on auxiliary winding $N_T$ may decrease gradually, so the sampling voltage signal may also decrease gradually. When secondary winding $N_s$ has been fully discharged, sampling voltage signal $V_s$ may drop suddenly to result in a relatively large error. Thus, it may be necessary to regulate secondary sampling voltage signal $V_s$ and current signal $I_s$ through voltage feedback circuit 305, and current feedback circuit 306, to obtain more precise output voltage feedback signal $V_F$ and output current feedback signal $I_F$. Along these lines, specific examples of voltage feedback circuit 305 and current feedback circuit 306 will be described in conjunction with the examples shown in FIGS. 6 and 7.

Figure 6A:
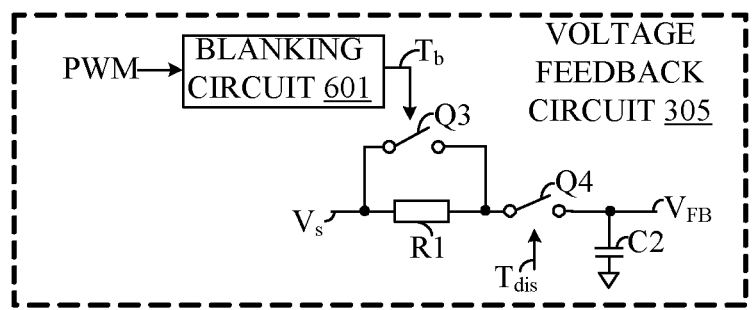
FIG. 6A is a schematic diagram of an example voltage feedback circuit of the CVCC controller in accordance with embodiments of the present invention.

Referring now to FIG. 6A, shown is a schematic diagram of an example voltage feedback circuit of the CVCC controller in accordance with embodiments of the present invention. Voltage feedback circuit 305 can include blanking circuit 601, switch Q3, switch Q4, resistor R1, and capacitor C2. Blanking circuit 601 can be controlled by the PWM control signal, and at each falling edge of the PWM control signal, blanking signal $T_b$ can be generated to control switch Q3. One terminal of resistor R1 can be used to receive secondary output voltage signal $V_s$, and the other terminal can be coupled to switch Q4. Switch Q3 can be parallel coupled to resistor R1. One terminal of capacitor C2 can be coupled to switch Q4, and the other terminal can be coupled to the ground. Also, switch Q4 can be controlled by timing signal $T_{dis}$. In addition, the common junction of switch Q4 and capacitor C2 can be configured as the output terminal of voltage feedback circuit 305 to generate output voltage feedback signal $V_{FB}$.

Figure 6B:
FIG. 6B is a waveform diagram of the voltage feedback circuit shown in FIG. 6A.

Referring now to FIG. 6B, shown is a waveform diagram of the voltage feedback circuit shown in FIG. 6A. At each falling edge of the PWM control signal, the secondary winding of the flyback converter may begin to discharge. At the same time, blanking signal $T_b$ generated by blanking circuit 601 can go high, so switch Q3 can be turned on. Also, timing signal $T_{dis}$ can be high to turn on switch Q4. Therefore, output voltage feedback signal $V_{FB}$ can be changed along with the variation of secondary output voltage signal $V_s$. Blanking signal $T_b$ can be used to ensure that switch Q3 has enough conduction time so as to precisely sample secondary output voltage signal $V_s$ and to reduce the perturbation caused during the discharging of secondary winding $N_s$ as much as possible. For example, blanking signal $T_b$ can last for a time from about 1 μs to about 2 μs.

As the discharging time increases, secondary output voltage signal $V_s$ can be gradually reduced. At the instant when secondary winding $N_s$ of the Flyback converter is fully discharged, secondary output voltage signal $V_s$ may drop suddenly. Because blanking signal $T_b$ may already be low, switch Q3 can be turned off. However, because of the delay circuit formed by resistor R1 and capacitor C2, output voltage feedback signal $V_{FB}$ may not rapidly discharge. At the same time, timing signal $T_{dis}$ may go low to turn off switch Q4. Thus, output voltage feedback signal $V_{FB}$ can be equal to the cross voltage of capacitor C2 and can maintained as substantially constant.

As can be seen from the example shown in FIG. 6A, voltage feedback circuit 305 can be used to regulate output voltage feedback signal $V_{FB}$. During the charging time of primary winding $N_p$, the cross voltage on auxiliary winding $N_T$ may be zero, and output voltage feedback signal $V_{FB}$ can be maintained as substantially stable to precisely reflect the variation of the output voltage.

Figure 7A:
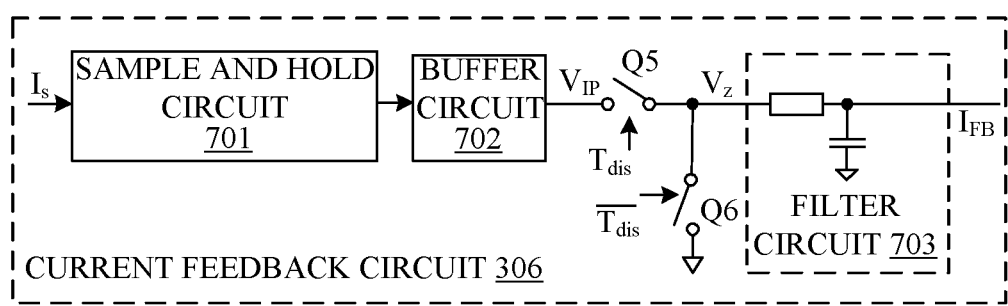
FIG. 7A is a schematic diagram of an example current feedback circuit of the CVCC controller in accordance with embodiments of the present invention.

Referring now to FIG. 7A, shown is a schematic diagram of an example current feedback circuit of the CVCC controller in accordance with embodiments of the present invention. Current feedback circuit 306 can include sample and hold circuit 701, buffer circuit 702. Also, a chopper circuit can include switches Q5 and Q6, and RC filter circuit 703. Sampling current signal $I_s$ representing the primary current of the flyback converter can be converted to peak amplifier signal $V_{IP}$ through sample and hold circuit 701 and buffer circuit 702. The chopper circuit including switches Q5 and Q6 can be used to receive peak amplifier signal $V_{IP}$, and to generate chopping signal $V_Z$ at the common junction of switches Q5 and Q6. Switch Q5 can be controlled by timing signal $T_{dis}$, while switch Q6 can be controlled by the inverted signal of timing signal $T_{dis}$. Filter circuit 703 can be used to receive chopping signal $V_Z$, and to generate output current feedback signal $I_{FB}$.

Figure 7B:
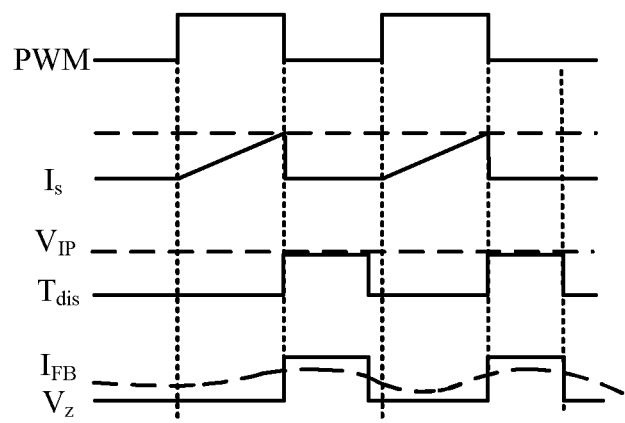
FIG. 7B is a waveform diagram of the current feedback circuit shown in FIG. 7A.

Referring now to FIG. 7B, shown is a waveform diagram of the current feedback circuit shown in FIG. 7A. As shown in FIG. 7B, sampling current signal $I_s$ may start increasing at each rising edge of the PWM control signal, and may drop suddenly when the PWM control signal goes low. Sample and hold circuit 701 can be used to receive sampling current signal $I_s$, and to hold the peak value of sampling current signal $I_s$. Buffer circuit 702 can be used to buffer and amplifier the peak value to generate peak amplifier signal $V_{IP}$, where the buffer magnification (e.g., 2, 3, 4, etc.) of buffer circuit 702 can be set according various application requirements.

The chopper circuit including switches Q5 and Q6 can be used to receive peak amplifier signal $V_{IP}$, where switch Q5 and switch Q6 can be controlled based on timing signal $T_{dis}$. With reference to the waveform of timing signal $T_{dis}$ in FIG. 7B, the waveform of chopping signal $V_z$ can be obtained, and a relatively smooth output current feedback signal $I_{FB}$ can be produced by filtering chopping signal $V_z$ through RC filter circuit 703.

Figure 8:
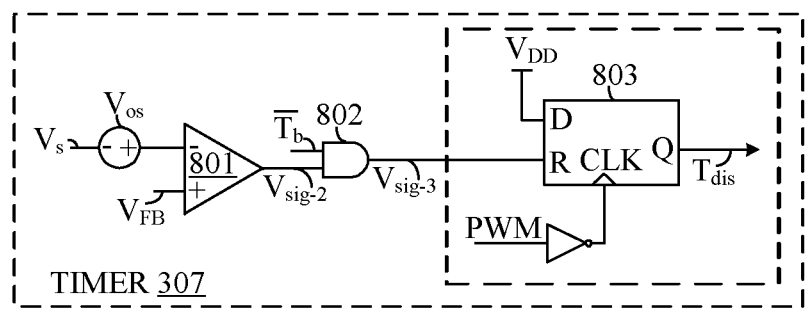
FIG. 8 is a schematic diagram of an example timer of the CVCC controller in accordance with embodiments of the present invention.

Referring now to FIG. 8, shown is a schematic diagram of an example timer of the CVCC controller in accordance with embodiments of the present invention. The timer can be used to measure the discharging time of secondary winding $N_s$ of the flyback converter, and to generate a timing signal $T_{dis}$. In this example, timer 307 can include comparator 801, AND-gate 802, and logic controller 803.

Comparator 801 can be used to receive output voltage feedback signal $V_{FB}$ at its non-inverting input terminal, and secondary output voltage signal $V_s$ representing the secondary output voltage of the flyback converter at its inverting input terminal, and to generate middle signal $V_{sig-2}$ at its output terminal. Offset voltage $V_{os}$ (e.g., about 100 mV) at the inverting terminal of comparator 801 can be set according to various application requirements. AND-gate 802 can be used to receive middle signal $V_{sig-2}$ and an inverted version of blanking signal $T_b$ to generate middle signal $V_{sig-3}$.

Logic controller 803 can be used to receive middle signal $V_{sig-3}$ and the PWM control signal. When middle signal $V_{sig-3}$ is activated, timing signal $T_{dis}$ output by logic controller 803 may be low. When middle signal $V_{sig-3}$ is inactive, timing signal $T_{dis}$ output by logic controller 803 may go high at each falling edge of the PWM control signal. In this example, logic controller 803 can include a D flip-flop or a set-reset type of flip-flop, where the D terminal of the D flip-flop can be used to receive voltage source $V_{DD}$, the R terminal can be used to receive middle signal $V_{sig-3}$, an inverted version of the PWM control signal can be input to the CLK terminal as a clock signal, and timing signal $T_{dis}$ can be generated at the output terminal of the D flip-flop.

For example, at the initial discharging time of secondary winding $N_s$, (e.g., at each falling edge of the PWM control signal), the difference between output voltage feedback signal $V_{FB}$ and secondary output voltage signal $V_s$ can be less than offset voltage $V_{os}$ of comparator 801. Thus, middle signal $V_{sig-2}$ output by comparator 801 may go low and be input to AND-gate 802. Middle signal $V_{sig-3}$ output by AND-gate 802 can also be low, and timing signal $T_{dis}$ generated by the D flip-flop may go high. When secondary winding $N_s$ of the flyback converter is fully discharged, the difference between output voltage feedback signal $V_{FB}$ and secondary output voltage signal $V_s$ may be larger than offset voltage $V_{os}$ of comparator 801. Middle signal $V_{sig-2}$ output by comparator 801 may go high, and an inverted version of blanking signal $T_b$ may be high. Thus, middle signal $V_{sig-3}$ output by AND-gate 802 may be high, and timing signal $T_{dis}$ may go low due to the D flip-flop.

From the above-described operation process, timing signal $T_{dis}$ can remain active during the discharging time of secondary winding $N_s$ of flyback converter, and can remain inactive when secondary winding $N_s$ is fully discharged. Thus, timing signal $T_{dis}$ can be used to control switch Q4 of voltage feedback circuit 305 and switches Q5 and Q6 of current feedback circuit 306. As one skilled in the art will recognize, timer 307 can be implemented by any other circuit with a same or similar function.

Figure 9:
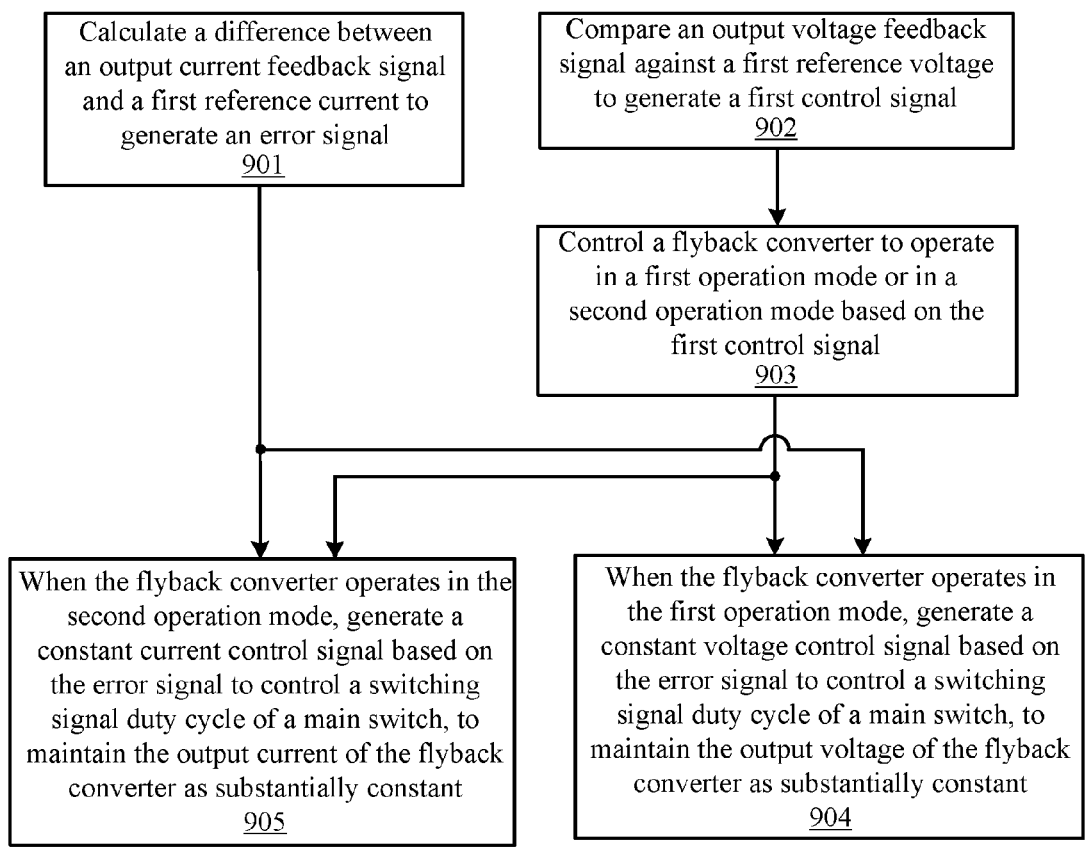
FIG. 9 is a flow diagram of an example CVCC control method in accordance with embodiments of the present invention.

Referring now to FIG. 9, shown is a flow diagram of an example CVCC control method in accordance with embodiments of the present invention. This example CVCC method can be used in a flyback converter, and may generate a constant voltage or a constant current control signal based on an output voltage feedback signal and an output current feedback signal of the flyback converter. For example, the constant voltage or the constant current control signal can be used to control the switching duty cycle of the main switch in flyback converter to maintain the output voltage or output current of the flyback converter as substantially constant.

The example CVCC control method can include, at 901, generating an error signal by calculating a difference between an output current feedback signal and a reference current. At 902, a control signal can be generated by comparing an output voltage feedback signal against a reference voltage. At 903, the flyback converter can be controlled to operate in a first operation mode or in a second operation mode based on the control signal.

When the flyback converter is operating in the first operation mode at 904, a constant voltage control signal can be generated based on the error signal, and a PWM control signal can be generated based on the constant voltage control signal to control a switching duty cycle of a main switch. Therefore, the output voltage of the flyback converter can be maintained as substantially constant. When the flyback converter is operating in the second operation mode at 905, a constant current control signal can be generated based on the error signal, and a PWM control signal can be generated based on the constant current control signal to control the switching duty cycle of a main switch. Therefore, the output current of the flyback converter can be maintained as substantially constant.

In this example method, step 902 can also include generating a first middle signal can be by comparing an output voltage feedback signal against a reference voltage. Also, a PWM control signal can be taken as a clock signal, and at each rising edge of the PWM control signal, the control signal can be generated based on the first middle signal.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A constant voltage constant current (CVCC) controller configured for a flyback converter, said CVCC controller comprising:
    a) a current controller configured to generate an error signal by calculating a difference between an output current feedback signal from a current feedback circuit and a reference current;
    b) a voltage controller configured to receive an output voltage feedback signal from a voltage feedback circuit and a reference voltage, and to generate a control signal;
    c) a selector comprising a first switch configured to receive said error signal and being controllable by said control signal, said selector being configured to control said flyback converter to operate in a first operation mode or a second operation mode based on said control signal, wherein said selector comprises a second switch coupled to said first switch and being controllable by an inverted version of said control signal, wherein said selector is configured to generate a constant voltage control signal based on said error signal when said flyback converter is operating in said first operation mode, and to generate a constant current control signal based on said error signal when said flyback converter is operating in said second operation mode, wherein said selector comprises a discharging circuit coupled between said second switch and ground, and a first capacitor coupled to said first and second switches and ground, wherein a cross voltage on said first capacitor is configured as said constant voltage control signal or said constant current control signal;
    d) a pulse-width modulation (PWM) controller configured to generate a PWM control signal to control a main switch of said flyback converter, wherein said PWM controller is configured to generate a constant voltage signal based on said constant voltage control signal to maintain an output voltage of said flyback converter as substantially constant when said flyback converter operates in said first operation mode, and wherein said PWM controller is configured to generate a constant current signal based on said constant current control signal to maintain an output current of said flyback converter as substantially constant when said flyback converter operates in said second operation mode; and
    e) a timer configured to measure a discharging time of a secondary winding of said flyback converter, and to generate a timing signal therefrom.

2. The CVCC controller of claim 1, wherein said current controller comprises a transconductance amplifier configured to receive said reference current and said output current feedback signal, and to generate said error signal.

3. The CVCC controller of claim 1, wherein said voltage controller comprises:
    a) a comparator configured to receive said reference voltage and said output voltage feedback signal, and to generate a middle signal; and
    b) a logic controller configured to generate said control signal at each rising edge of said PWM control signal based on said middle signal, wherein said PWM control signal is configured as a clock signal.

4. The CVCC controller of claim 1, wherein said discharging circuit comprises at least one of: a constant resistor, a variable resistor, a constant current source, and a variable current source.

5. The CVCC controller of claim 1, wherein a discharge current of said discharging circuit is controllable based on said output voltage feedback signal.

6. The CVCC controller of claim 1, wherein said voltage feedback circuit comprises:
   a) a blanking circuit controllable by said PWM control signal, wherein a blanking signal is generated by said blanking circuit at each falling edge of said PWM control signal;
   b) a third switch controllable by said blanking signal;
   c) a resistor coupled in parallel to said third switch and configured to receive a signal representing a secondary output voltage of said flyback converter;
   d) a fourth switch coupled to said resistor and controllable by a timing signal; and
   e) a second capacitor coupled to said fourth switch and ground, wherein a common node of said fourth switch and said second capacitor is configured to generate said output voltage feedback signal.

7. The CVCC controller of claim 1, wherein said current feedback circuit comprises:
   a) a sample and hold circuit configured to receive a signal representing a primary output current of said flyback converter;
   b) a buffer circuit coupled to said sample and hold circuit, wherein said buffer circuit is configured to generate a peak amplifier signal;
   c) a chopper circuit having third and fourth switches, wherein said chopper circuit is configured to receive said peak amplifier signal, and to generate a chopping signal at a common node of said third and fourth switches, wherein said third switch is controllable by a timing signal, and said fourth switch is controllable by an inverted version of said timing signal; and
   d) a filter circuit configured to receive said chopping signal, and to generate said output current feedback signal.

8. The CVCC controller of claim 1, wherein said flyback converter is configured to operate in said first operation mode in response to said control signal being a pulse signal with a fixed duty cycle.

9. The CVCC controller of claim 8, wherein said flyback converter is in a normal light-load state.

10. The CVCC controller of claim 1, wherein said flyback converter is configured to operate in said second operation mode in response to said control signal being a fixed high signal.

11. The CVCC controller of claim 10, wherein said flyback converter is in an abnormal heavy-load state.

12. A constant voltage constant current (CVCC) control method for a flyback converter, the method comprising:
   a) calculating a difference between an output current feedback signal from a current feedback circuit and a reference current to generate an error signal;
   b) comparing an output voltage feedback signal from a voltage feedback circuit and a reference voltage to generate a control signal;
   c) controlling said flyback converter to operate in a first operation mode or a second operation mode based on said control signal;
   d) generating, by a selector, a constant voltage control signal based on said error signal, and generating a pulse-width modulation (PWM) control signal based on said constant voltage control signal to control a switching duty cycle of a main switch of said flyback converter, and maintaining an output voltage of said flyback converter as substantially constant when said flyback converter is operating in said first operation mode;
   e) generating, by said selector, a constant current control signal based on said error signal, and generating a PWM control signal based on said constant current control signal to control said switching duty cycle of said main switch, and maintaining an output current of said flyback converter as substantially constant when said flyback converter is operating in said second operation mode, wherein said selector comprises a first switch receiving said error signal and being controllable by said control signal, and a second switch coupled to said first switch and being controllable by an inverted version of said control signal, wherein said selector comprises a discharging circuit coupled between said second switch and ground, and a first capacitor coupled to said first and second switches and ground, and wherein a cross voltage on said first capacitor is configured as said constant voltage control signal or said constant current control signal; and
   f) generating a timing signal by a timer that measures a discharging time of a secondary winding of said flyback converter.

13. The method of claim 12, further comprising:
   a) generating a middle signal by comparing said output voltage feedback signal against a reference voltage; and
   b) generating said control signal based on said middle signal at each rising edge of said PWM control signal, wherein said PWM control signal is configured as a clock signal.

14. The method of claim 12, wherein said output voltage feedback signal is generated by sampling and holding a signal representing a secondary output voltage of said flyback converter.

15. The method of claim 14, wherein said output current feedback signal is further generated by amplifying, chopping, and filtering said signal representing said secondary output current of said flyback converter.

16. The method of claim 12, wherein said controlling said flyback converter to operate in said first or second operation mode based on said control signal comprises controlling said flyback converter operate in said first operation mode in response to said control signal being a pulse signal with a fixed duty cycle.

17. The method of claim 12, wherein said controlling said flyback converter to operate in said first or second operation mode based on said control signal comprises controlling said flyback converter operate in said second operation mode in response to said control signal being a fixed high signal.

18. The method of claim 12, wherein:
   a) said flyback converter is in a normal light-load state for said first operation mode; and
   b) said flyback converter is in an abnormal heavy-load state for said second operation mode.

* * * * *